United States Patent
Nishide

(10) Patent No.: US 6,619,148 B2
(45) Date of Patent: Sep. 16, 2003

(54) LUBRICANT SUPPLY DEVICE AND ROLLING MEMBER SCREW APPARATUS USING SAME

(75) Inventor: Tetsuhiro Nishide, Tokyo-to (JP)

(73) Assignee: THK Co., Ltd., Tokyo (JP)

( * ) Notice: Subject to any disclaimer, the term of this patent is extended or adjusted under 35 U.S.C. 154(b) by 71 days.

(21) Appl. No.: 09/783,974

(22) Filed: Feb. 16, 2001

(65) Prior Publication Data

US 2002/0056330 A1 May 16, 2002

(30) Foreign Application Priority Data

Mar. 15, 2000 (JP) .................................. 2000-077794

(51) Int. Cl.$^7$ ............................................. F16C 17/00
(52) U.S. Cl. ............................................. 74/89.44; 184/5
(58) Field of Search ............................... 74/89.44, 467; 384/13; 184/6.12, 64, 87

(56) References Cited

U.S. PATENT DOCUMENTS

| | | | | |
|---|---|---|---|---|
| 1,937,949 A | * | 12/1933 | Flather et al. | .............. 184/6.14 |
| 3,132,719 A | * | 5/1964 | Cole | .......................... 74/89.44 |
| 3,499,624 A | * | 3/1970 | Custer | ....................... 74/89.44 |
| 5,050,707 A | * | 9/1991 | Wilhelmsen | ................. 184/64 |
| 6,125,968 A | * | 10/2000 | Shirai | ............................ 184/65 |
| 6,216,821 B1 | | 4/2001 | Namimatsu et al. | |
| 6,364,058 B1 | * | 4/2002 | Nishide et al. | ............. 74/89.44 |

FOREIGN PATENT DOCUMENTS

| EP | 0 950 465 | * 10/1999 |
|---|---|---|
| EP | 1031767 A | 8/2000 |
| JP | H11-50922 | 2/1999 |
| JP | 2000-249209 | 9/2000 |

* cited by examiner

*Primary Examiner*—William C Joyce
(74) *Attorney, Agent, or Firm*—Armstrong, Westerman & Hattori, LLP

(57) ABSTRACT

A lubricant supply device comprises application members, a casing and control members. The casing forms a lubricant storage member, which is divided into compartments arranged in the circumferential direction of the lubricant storage member. The number of the compartments is equal to or larger than the number of thread grooves of the screw shaft. The application members are placed in correspondence to the compartments. Each of the application members has the single tongue portion.

10 Claims, 9 Drawing Sheets

LUBRICANT SUPPLY DEVICE AND ROLLING MEMBER SCREW APPARATUS USING SAME

BACKGROUND OF THE INVENTION

1. Field of the Invention

The present invention relates to a lubricant supply device for supplying lubricant to a screw shaft of a rolling-member screw apparatus and to a rolling member screw apparatus using such a lubricant supply device.

2. Description of the Related Art

A rolling-member screw apparatus such as a ball screw has conventionally been known. The rolling-member screw apparatus comprises a screw shaft, a nut member and a plurality of balls. The screw shaft has a ball running groove formed spirally on the outer periphery of the screw shaft. The nut member is engaged with the screw shaft. The nut member has a ball circulation passage formed therein, which includes a loaded ball running groove formed spirally on the inner periphery of the nut member so as to correspond to the above-mentioned ball running groove. The balls are placed and received in the ball circulation passage. A relative rotation of the nut member to the screw shaft causes the balls to roll in the ball running groove so that the nut member can move linearly relative to the screw shaft.

With respect to a lubricant supply device for lubricating the ball running groove of such a rolling member screw apparatus, the present inventor made an invention of a lubricant supply device as shown in FIG. 10 (as disclosed in Japanese Patent Application No. H11-50922). The lubricant supply device comprises an application member 52 having tongue portions 51, 51 coming into contact with ball running grooves of a screw shaft to apply the lubricant on the ball running groove, a casing 54 for forming a lubricant storage member 53, from which the lubricant is supplied to the application member 52, and a joint member 55 for controlling an amount of lubricant supplied from the lubricant storage member 53 to the application member 52. An occlusion member 56, which absorbs the lubricant to store it, is fitted into the lubricant storage member 53.

When the tongue portions 51, 51 move, while coming into contact with the ball running grooves, the lubricant is supplied from the tongue portions 51, 51 into the ball running grooves. When an amount of the lubricant absorbed in the application member 52 is gradually decreased, the lubricant absorbed in the occlusion member 56 is supplied to the application member 52 through the joint member by capillary action. Accordingly, a prescribed amount of lubricant is always absorbed in the application member, thus making it possible to stably supply the lubricant from the tongue portions 51, 51 to the ball running grooves.

In the lubricant supply device disclosed in the above-mentioned Japanese Patent Application No. H11-50922, the single application member 52 has the tongue portions 51, 51, which are arranged in line in the axial direction of the screw shaft. The number of the tongue portions 51, 51 is equal to the number of the thread grooves of the screw shaft. The lubricant is supplied to the entire ball running grooves, irrespective of the number of the thread grooves of the screw shaft. Arrangement of the application member 52 below the lower portion of the lubricant storage member causes the lubricant to concentrate in the application member 52 by the function of gravity, thus gathering the lubricant in the single place to apply it onto the ball running grooves.

However, when the tongue portions 51, 51, the number of which is equal to the number of the thread grooves, are arranged in line on the single application member 52, the length of the application member 52 increases in proportion to the number of the thread grooves of the screw shaft, with the result that the length of the lubricant supply device in its longitudinal direction may become unnecessarily longer.

In addition, a user does not always mount the lubricant supply device on the ball screw so that the application member 52 of the lubricant supply device is placed on the lower side of the ball screw. When the application member 52 is not placed on the lower side of the ball screw, the lubricant received in the lubricant storage member 53 may not be supplied to the application member 52.

SUMMARY OF THE INVENTION

An object of the present invention is therefore to provide a lubricant supply device, which permits supply of substantially all the amount of lubricant received in the device to flow out and which has a decreased length of the device in the axial direction of the screw shaft, and a rolling member screw apparatus.

In order to attain the aforementioned object, a lubricant storage member is divided into a plurality of compartments arranged in the circumferential direction of the screw shaft. The number of the compartments is equal to or larger than the number of the thread grooves of the screw shaft. Application members are placed in correspondence to the compartments. Each of the application members has a tongue portion. More specifically, the lubricant supply device of the present invention, which is to be fitted to a nut member engaging with a screw shaft having at least two thread grooves through rolling members to supply lubricant to the screw shaft along with a relative rotational motion of the nut member to the screw shaft, comprises:

- a plurality of application members for applying the lubricant on the screw shaft, each of said application members having a tongue portion, which comes into contact with rolling-member running surfaces of the screw shaft;
- a casing for forming a lubricant storage member, from which the lubricant is supplied to said application members; and
- a plurality of control members for controlling an amount of the lubricant supplied from said lubricant storage member to said application members, wherein:

said lubricant storage member is formed into a cylindrical shape into which the screw shaft is loosely inserted, said lubricant storage member being divided into a plurality of compartments arranged in a circumferential direction of the lubricant storage member, the number of the compartments being equal to or larger than the number of said at least two thread grooves of the screw shaft;

said application members are placed in correspondence with the compartments; and each of said application members has a tongue portion.

According to the present invention having the above-mentioned structure, the relative rotation of the screw shaft to the nut member causes the lubricant to be supplied from the tongue portions of the application members to the rolling member running surfaces of the screw shaft. The control members control an amount of lubricant supplied from the lubricant storage member to the application members. As a result, an amount of lubricant supplied from the lubricant storage member to the application members does not vary drastically in the course of time, thus leading to a constant supply of the lubricant in a prescribed amount from the application members to the screw shaft. It is therefore possible to apply the lubricant to the screw shaft in a minimum amount for a long period of time.

The relative rotation of the tongue portions to the screw shaft causes the tongue portions to move along the spiral rolling member running surfaces, while applying the lubricant onto the rolling member running surfaces of the screw shaft. The lubricant storage member is divided into a plurality of compartments arranged in the circumferential direction of the lubricant storage member. The number of the compartments is equal to or larger than the number of the thread grooves of the screw shaft. The application members are placed in correspondence to the compartments. Accordingly, the rolling member running surfaces can be lubricated entirely. In addition, almost all the amount of lubricant received in the lubricant supply device can be supplied to flow out, irrespective of the mounting posture of the lubricant supply device on an rolling members screw apparatus. Further, each of the application members has the single tongue portion formed thereon. It is therefore possible to prevent the application member from becoming longer in the axial direction of the screw shaft, thus providing the lubricant supply device having the decreased length in the axial direction of the screw shaft.

As the application member, there may be used material, which can smoothly apply the lubricant absorbed therein on the screw shaft, for example, oil absorbent material having a relatively low porosity, which is formed of fiber-entangled body such as felt, or of sintered resin.

With respect to the lubricant storage member, any structural component, which can store in its inside a large amount of lubricant supplied to the application member, may suffice. As the lubricant storage member, there may be used for example either a tank having in its inside a storage chamber for receiving the lubricant, or oil absorbent material including fiber-entangled body such as felt, sintered resin or sponge by which the lubricant is actually absorbed. The oil absorbent material preferably has a higher porosity than that of the oil absorbent material described above, which serves as the application member.

With respect to the control member, any structural component, which can control an amount of lubricant supplied from the lubricant storage member to the application member, may suffice. As the control device, there may be used, for example, oil absorbent material, which is formed of a fiber-entangled body, such as felt, or of sintered resin. The oil absorbent material for the control member preferably has a porosity, which is between the low porosity of the oil absorbent material for the application member and the high porosity of the oil absorbent material for the lubricant storage member. As the control device, there maybe used an oil supply adjusting plate, which can be obtained by forming supply holes, through which the lubricant can pass, on a thin plate separating the lubricant storage member and the application member from each other.

There may be adopted an inventive structure that said casing has a plurality of slits formed therein, said slits extending in a longitudinal direction of a central axis of the screw shaft so as to correspond to the compartments, respectively; and said application members are fitted into the slits, respectively. According to such an inventive structure, it is possible to prevent the application member from projecting from the lubricant storage member in the axial direction of the screw shaft, thus providing the lubricant supply device having its decreased length in the axial direction of the screw shaft.

There may be adopted an inventive structure that said casing has a cylindrical portion through which the compartments pass in the longitudinal direction of the central axis of the screw shaft. According to such an inventive structure, the compartments pass through the cylindrical portion in the axial direction of the screw shaft so as to avoid the complicated working required in the prior art. More specifically, the cylindrical portion can be manufactured by an extrusion molding method (or an injection molding method), thus providing the lubricant supply device at a low cost.

There may be adopted an inventive structure that said cylindrical portion has the slits passing through the cylindrical portion in the longitudinal direction of the central axis of the screw shaft. According to such an inventive structure, the more complicated working required in the prior art can be avoided. More specifically, the cylindrical portion having the compartments and the slits can be manufactured by an extrusion molding method (or an injection molding method), thus providing the lubricant supply device at a low cost.

There may be adopted an inventive structure that each of said application members and said control members comprises oil absorbent material, which can absorb the lubricant to store same; each of said application members is formed into a plate-shape, said each of the application members being placed in each of the slits so as not to come into contact with any one of the compartments; and each of said control members comprises a main body and an elongated portion, said main body being placed in the respective slit so as to come into contact with the respective application member, but so as not to come into contact with the respective compartment, and said elongated portion extending from the main body so as to come into contact with the respective compartment. According to such an inventive structure, the lubricant absorbed in the application member is applied onto the rolling member running surface of the screw shaft, while the lubricant stored in the lubricant storage member is supplied to the application member thorough the elongated portion and the main body of the control member. The optimum determination of the shapes of the elongated portion and the main body, a contact area of the elongated portion with the inside of the lubricant storage member and the contact area of the main body with the application member makes it possible to supply the lubricant from the lubricant storage member to the application member in a properly controlled manner.

There may be adopted an inventive structure that each of said compartments has an occlusion member fitted therein, said occlusion member absorbing the lubricant to store same; and porosity of the occlusion member, the control member and the application member are determined to be smaller in this order. According to such a structure, it is possible to preserve an amount of lubricant, which is required to be applied, in the application member and impart strength, which is sufficient to bear the contact slide with the rolling-member running surface, to the application member. Use of the oil absorbent material having a high porosity as the occlusion member makes it possible to ensure the sufficient amount of lubricant preserved therein. When the fiber-entangle body, which can cause capillary action, is used as material for forming the occlusion member, the control member and the application member, sucking force caused by the capillary action becomes larger in this order. Accordingly, no congestion of the lubricant in the passage therefor occurs, thus providing smooth supply of the lubricant.

A rolling member screw apparatus of the present invention comprises:

a screw shaft having at least two rolling member running surfaces formed spirally on an outer periphery thereof;

a nut member engaged with the screw shaft, said nut member having a rolling member circulation passage formed therein, said rolling member circulation passage including at least two loaded rolling member running surfaces formed spirally so as to correspond to said at least two rolling running surfaces;

a plurality of running members being placed and received in the rolling member circulation passage; and a lubricant supply device for supplying lubricant to the screw shaft along with a relative rotational motion of the nut member to the screw shaft, wherein:

said lubricant supply device comprises:

a plurality of application members for applying the lubricant on the screw shaft, each of said application members having a tongue portion, which comes into contact with a rolling-member running surface of the screw shaft;

a casing for forming a lubricant storage member, from which the lubricant is supplied to said application members; and a plurality of control members for controlling an amount of the lubricant supplied from said lubricant storage member to said application members said lubricant storage member is formed into a cylindrical shape into which the screw shaft is loosely inserted, said lubricant storage member being divided into a plurality of compartments arranged in a circumferential direction of the lubricant storage member, the number of the compartments being equal to or larger than the number of said at least two thread grooves of the screw shaft;

said application members are placed in correspondence to the compartments; and each of said application members has the tongue portion.

The other lubricant supply device of the present invention, which is to be fitted to a nut member engaging with a screw shaft through rolling members to supply lubricant to the screw shaft along with a relative rotational motion of the nut member to the screw shaft, comprises:

a plurality of application members for applying the lubricant on the screw shaft, each of said application members having a tongue portion, which comes into contact with a rolling-member running surface of the screw shaft;

a casing for forming a lubricant storage member, from which the lubricant is supplied to said application members; and a plurality of control members for controlling an amount of the lubricant supplied from said lubricant storage member to said application members, wherein:

said lubricant storage member is formed into a cylindrical shape into which the screw shaft is loosely inserted, said lubricant storage member being divided into a plurality of compartments arranged in a circumferential direction of the lubricant storage member;

said casing has a cylindrical portion through which the compartments pass in the longitudinal direction of a central axis of the screw shaft.

According to the present invention having the above-mentioned structure, the lubricant storage member is divided into a plurality of compartments. It is therefore possible to supply almost all the amount of lubricant received in the lubricant supply device to flow out, irrespective of the mounting posture of the lubricant supply device on the rolling member screw apparatus. In addition, the casing has the cylindrical portion through which the compartments pass in the longitudinal direction of the central axis of the screw shaft. The complicated working as required in the prior art can be avoided. More specifically, the cylindrical portion can be manufactured by an extrusion molding method (or an injection molding method), thus providing the lubricant supply device at a low cost. The cylindrical portion may be formed integrally with the casing or the former may be formed independently from the latter.

In such a lubricant supply device of the present invention, there may be adopted an inventive structure that said casing has a plurality of slits formed therein, said slits extending in the longitudinal direction of the central axis of the screw shaft so as to correspond to the compartments, respectively; and said application members are placed in correspondence to the compartments and fitted into the slits, respectively; said cylindrical portion has the slits passing through the cylindrical portion in the longitudinal direction of the central axis of the screw shaft. According to such an inventive structure, the more complicated working required in the prior art can be avoided. More specifically, the cylindrical portion having the compartments and the slits can be manufactured by an extrusion molding method (or an injection molding method), thus providing the lubricant supply device at a low cost.

DETAILED DESCRIPTION OF THE PREFERRED EMBODIMENTS

Now, embodiments of a lubricant supply device of the present invention will be described in detail below with reference to the accompanying drawings.

Figure 1:
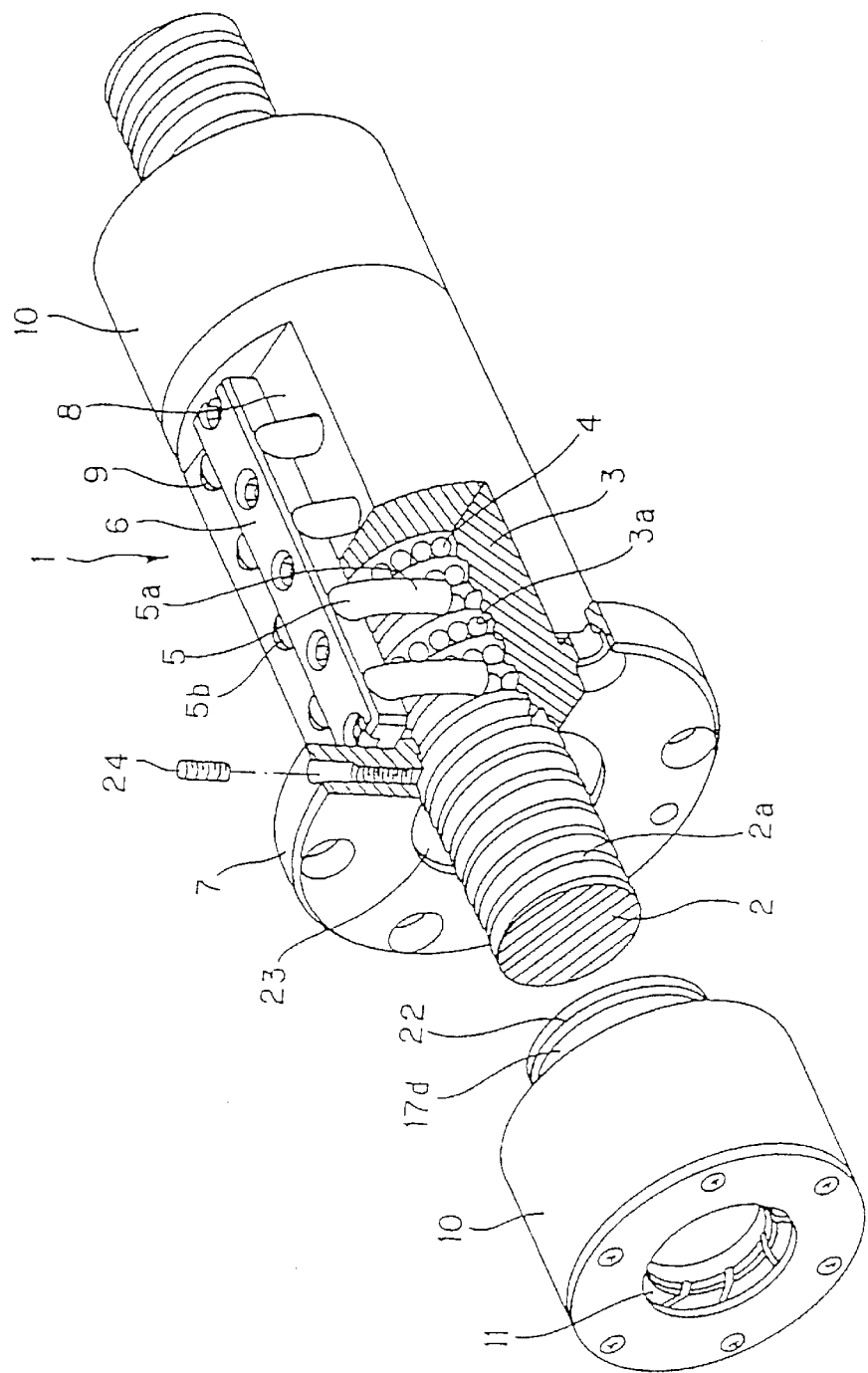
FIG. 1 is a perspective view illustrating a ball screw into which a lubricant supply device of the first embodiment of the present invention is incorporated.

FIG. 1 is a perspective view illustrating a ball screw (i.e., a rolling member screw apparatus) into which a lubricant supply device of the first embodiment of the present invention is incorporated. The ball screw 1 comprises a screw shaft 2 (i.e., a track shaft), a nut member 3 and a plurality of balls 4 . . . 4. The screw shaft 2 has on its outer peripheral surface spiral ball running grooves 2a serving as rolling member running surfaces. The nut member 3 has on its inner peripheral surface a ball circulation passage (i.e., a rolling member circulation passage), which includes spiral loaded ball running grooves 3a serving as loaded rolling member running surfaces so as to correspond to the spiral ball running grooves 2a of the screw shaft 2. The nut member 3 engages with the screw shaft 2 so as to be capable of making a relative motion of the former relative to the latter. The balls 4 . . . 4 are received in the ball circulation passage in the form of trains so as to serve as rolling members that can be circulated along with the relative (rotational) motion of the nut member 3 to the screw shaft 2. The loaded ball running passage of the above-mentioned ball circulation passage is formed between the ball running groove 2a of the screw shaft 2 and the loaded ball running groove 3a of the nut member 3.

The number of the thread grooves of the screw shaft 2 is two or more. The screw shaft 2 has for example four ball running grooves 2a. The ball running grooves 2a are formed on the screw shaft 2 by a grinding or form rolling method so as to reveal an arcuate cross section.

The main body of the nut member 3 is formed into a tubular shape and has at its one end a flange portion 7 to which a counterpart is to be connected. The main body of the nut member 3 has a flat portion 8, which is formed by subjecting a prescribed portion on the peripheral surface of the main body to a machinery cut. The flat portion 8 has eight return pipe-fitting holes 9 . . . 9 into which the ends of return pipes 5 . . . 5 are fitted. The return pipe-fitting holes 9 . . . 9 extend to reach the loaded ball running groove 3a. The nut member 3 has the four return pipes 5 . . . 5. The return pipes 5 . . . 5 form a non-loaded return passage, which connects one end with the other end of the loaded ball running passage mentioned above. The both ends of each of the return pipes 5 . . . 5 are fitted into holes formed in the main body of the nut member 3. The return pipes 5 . . . 5 are separated from each other by a few pitches of the screw shaft 2 in its longitudinal direction. The return pipes 5 . . . 5 are held on the main body of the nut member 3 by means of a pipe retainer 6.

When the screw shaft 2 rotates, the tip ends of leg portions 5a . . . 5a of the return pipes 5 scoop up the balls 4 . . . 4, which roll in the ball running groove 2a under loaded condition. The scooped balls 4 . . . 4 pass through the return pipe 5. The balls 4 . . . 4 are returned into the ball running groove 2a from the leg portion 5b of the other return pipe 5, which is separated from the above-mentioned return pipes by a few pitches of the screw shaft 2. When the screw shaft 2 rotates in the opposite direction, the balls 4 . . . 4 circulate through a reverse route. The circulation of the balls 4 . . . 4 is also made, when the nut member 3 rotates relative to the screw shaft 2 serving as the stationary member.

The lubricant supply device 10 for supplying the lubricant to the screw shaft 2 is mounted to the opposite ends of the nut member 3. The lubricant supply device 10 rotates together with the nut member 3 relative to the screw shaft 2 to apply the lubricant on the ball running grooves 2a of the screw shaft 2. The lubricant supply device 10 is provided with a wiper ring 11 for discharging foreign substances outside, which may be attached on the surface of the screw shaft 2.

Figure 2:
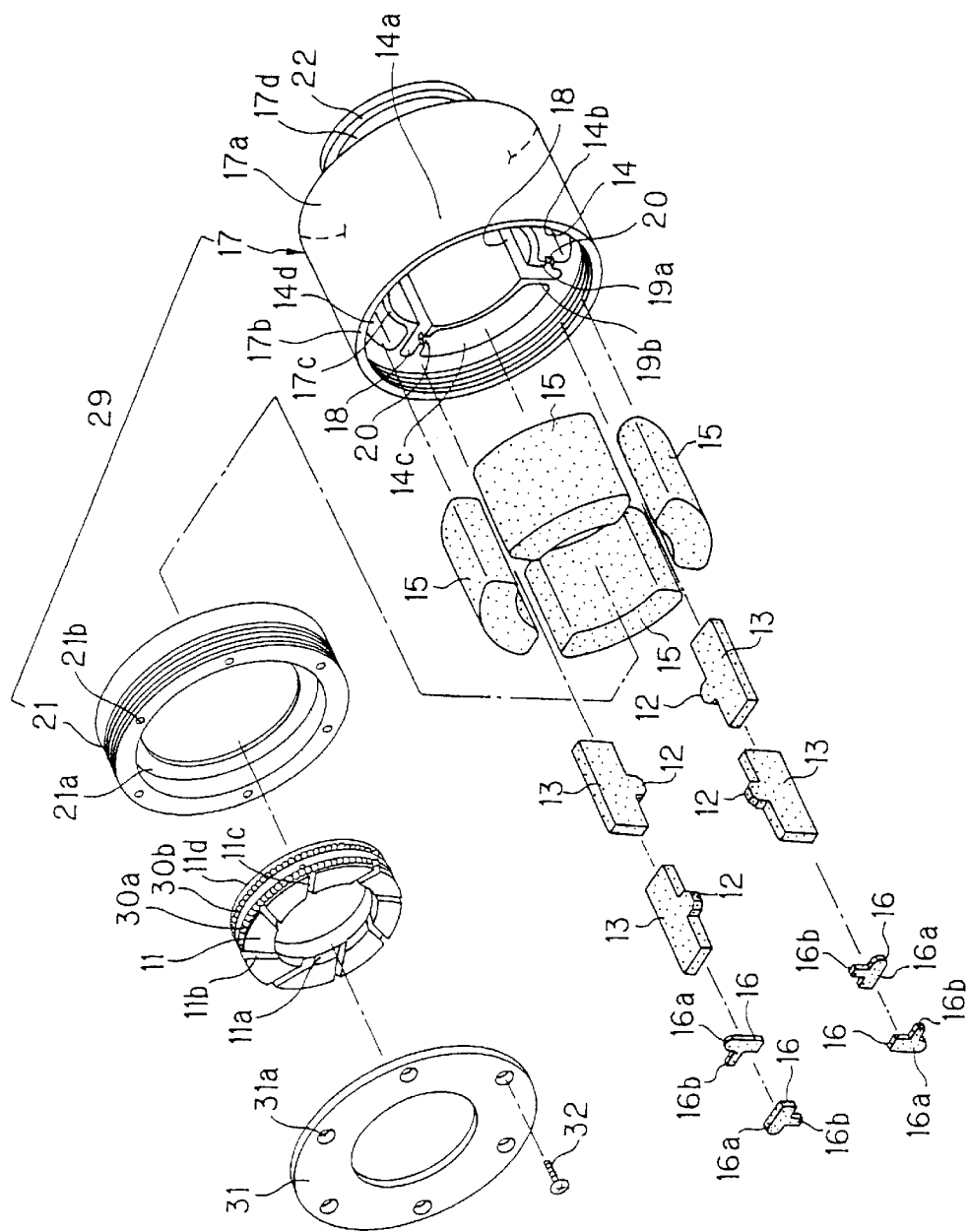
FIG. 2 is an exploded perspective view of the lubricant supply device of the first embodiment of the present invention.

FIG. 2 is an exploded perspective view of the lubricant supply device 10 of the first embodiment of the present invention. The lubricant supply device 10 comprises application members 13, a casing 29, occlusion members 15 and joint members 16. Each of the application members 13 has a tongue portion 12, which can come into contact with the ball running groove 2a of the screw shaft 2. The casing 29 forms a lubricant storage member 14 from which the lubricant is supplied to the application member 13. The occlusion members 15 are received in the lubricant storage member 14. Each of the joint members 16 serves as the control device for controlling an amount of the lubricant supplied from the occlusion member 15 to the application member 13.

The casing 29 comprises a case body 17 for forming the lubricant storage member 14 and a ring-shaped case 21 into which the wiper ring 11 described later is received. The case body 17 comprises a base plate 17a formed into a disc-shape, an outer tube 17b formed on the outer periphery of the base plate 17a so as to extend in the perpendicular direction to the base plate 17a, and an inner tube 17c provided in the inside of the outer tube 17b. The space between the outer tube 17b and the inner tube 17c is used as the lubricant storage member 14. The lubricant storage member 14 is formed into a cylindrical shape into which the screw shaft is loosely inserted. The lubricant storage member 14 is divided into four compartments 14a, 14b, 14c and 14d, the number of which is equal to the number of the thread grooves of the screw shaft 2. These compartments 14a, 14b, 1c and 14d are arranged in the circumferential direction of the lubricant storage member 14.

The case body 17 has four slits 18, which extend in the axial direction of the screw shaft 2 and are spaced in the circumferential direction of the case body at regular intervals so as to correspond to the compartments 14a, 14b, 14c and 14d. More specifically, each of the slits 18 is obtained by forming an elongated cut on the inner tube 17c in its longitudinal direction to form the opposite cut edges of the inner tube 17c and providing a pair of partition walls 19a, 19b to connect the above-mentioned opposite cut edges of the inner tube 17c to the outer tube 17b, respectively. The application members 13 are fitted into the respective slits 18. The slit 18 opens also at its longitudinal front end, i.e., its opposite end to the base plate 17a. A cut-out 20 into which the joint member 16 is to be fitted, is formed in the vicinity of the open end of the slit 18, i.e., the longitudinal front end of the partition wall 19a. The outer tube 17b has on the inner peripheral surface of its front end a female-screw portion with which a sealing case 21 is to be engaged. The longitudinal length of the inner tube 17c is shorter than the longitudinal length of the outer tube 17b so as to permit to fit the sealing case 21 into the front end of the outer tube 17b. The base plate 17a has a tubular inlet portion 17d, which is formed on the outer surface of the base plate 17a so as to project in the perpendicular direction thereto. The tubular inlet portion 17d has a function of connecting the lubricant supply device to the nut member. The inlet portion 17d has a groove 22 that is formed on the outer periphery of the inlet portion 17d so as to extend in the peripheral direction thereof. As shown in FIG. 1, the inlet portion 17d can be fitted into a ring-shaped groove 23, which is formed on the flange portion 7 of the nut member 3. The lubricant supply device 10 is firmly held on the nut member 3 by fastening a screw 24, which is screwed in the flange portion 7 of the nut member 3 so as to be movable in the radial direction thereof, to engage the front end of the screw 24 with the groove 22 of the inlet portion 17d.

Each of the occlusion members 15 has an arcuate shape corresponding to each of the compartments 14a, 14b, 14c and 14*d*, which are obtained by dividing the lubricant storage member 14 into four equal parts in its circumferential direction. Each of the occlusion members 15 is fitted into the respective compartment. As the occlusion member 15, there is used oil absorbent material, which can absorb the lubricant to store it. With respect to the oil absorbent material for the occlusion member 15, it is preferable to use fiber-entangled body such as felt having a relatively high porosity in order to store a large amount of lubricant. In view of this fact, the combination of rayon and wooly felt is used in the embodiment of the present invention. The combination of rayon and wooly felt is designed so as to prevent the lubricant absorbed by it from moving downward under its gravity.

Each of the joint members 16, which serve as the control members for controlling an amount of lubricant supplied from the occlusion members 15 to the application members 13, comprises a main body 16*a*, which is disposed in the slit 18 so as to come into contact with the application member 13, but so as not to come into contact with any one of the compartments 14*a*, 14*b*, 14*c* and 14*d*, and an elongated portion 16*b*, which is formed integrally with the main body 16*a* and extends therefrom to reach the compartments 14*a*, 14*b*, 14*c* or 14*d*. The shape of the main body 16*a* is substantially identical with the cross-sectional shape of the slit 18 so that the main body 16*a* can be fitted into the front end of the slit 18. The elongated portion 16*b* extends from the central portion of the main body 16*a* at right angles thereto so as to come into contact with the occlusion member 15. Accordingly, the joint member 16 composed of the main body 16*a* and the elongated portion 16*b* has a T-shape. The elongated portion 16*b* is fitted into the cutout 20 formed on the partition wall 19*a* of the casing body 17. The lubricant stored in the occlusion member 15 is supplied to the application member 13 through the elongated portion 16*b* and the main body 16*a* of the joint member 16. As the joint member 16, there is used oil absorbent material, which can absorb the lubricant to store it. With respect to the oil absorbent material for the joint member 16, it is preferable to use fiber-entangled body such as felt having a porosity, which is middle between the porosities of the occlusion member 15 and the application member 13. In view of this fact, wooly felt is used in the embodiment of the present invention.

Each of the application members 13 for applying the lubricant on the ball running groove 2*a* of the screw shaft 2 is formed into a rectangular shape. The application member 13 is fitted into the respective slit 18 so as not to come into contact with the compartment 14*a*, 14*b*, 14*c* or 14*d*. The four application members 13, which are provided for the respective four compartments 14*a*, 14*b*, 14*c* and 14*d*, are fitted into the respective slits 18. The application member 13 has a thickness, which is substantially identical with the width of the slit 18 so that it can be fitted into the slit 18. The height of the application member 13 is substantially identical with the height of the slit 18. Arrangement of the application members 13 in the slits makes it possible to prevent the application members 13 from projecting from the compartments 14*a*, 14*b*, 14*c* and 14*d* in the axial direction thereof, thus providing the lubricant supply device having the decreased length in the axial direction of the screw shaft. Each of the application members 13 is provided on its upper portion with a single tongue portion 12 having a rectangular shape, which can come into contact with the ball running groove 2*a* of the screw shaft 2. The tongue portion 12 has a chamfer 26, which can come into contact with the ball running groove having the arcuate cross section. As the application member 13, there is used oil absorbent material, which can absorb the lubricant to store it. With respect to the oil absorbent material for the application member 13, it is preferable to use fiber-entangled body such as felt having a relatively low porosity. Wooly felt is used in the embodiment of the present invention. Use of the oil absorbent material such as felt having a relatively low porosity makes it possible to store an amount of lubricant, which is required to be applied, in the application member 13 and impart strength, which is sufficient to bear the contact slide with the rolling-member running surface, to the application member 13.

Figure 3:
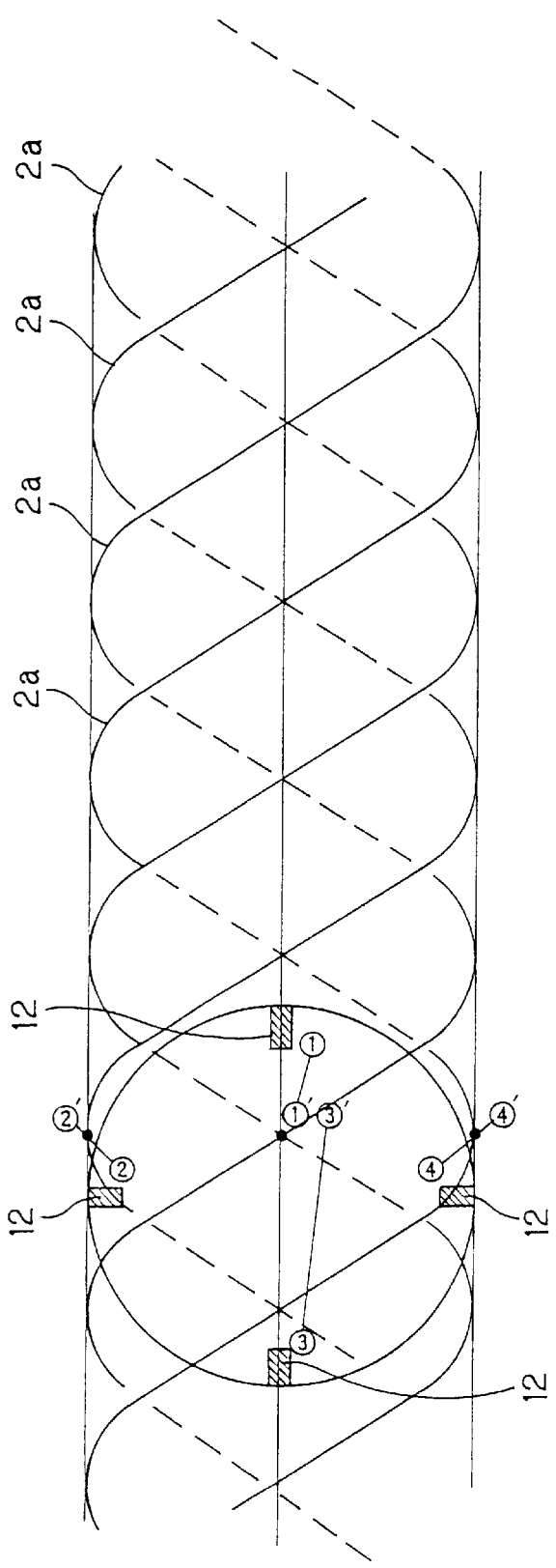
FIG. 3 is a view illustrating the relationship between the ball running grooves and the tongue portions of the first embodiment of the present invention.

FIG. 3 illustrates the relationship between the four ball running grooves 2*a* and the four tongue portions 12 of the first embodiment of the present invention. FIG. 3 is a composite view of a schematic front view of the screw shaft having the four ball running grooves 2*a* and a schematic side view of the lubricant supply device having the four tongue portions 12. The four tongue portions 12 are placed in positions ① to ④ at regular intervals in the circumferential direction of the screw shaft 2. An imaginary circular plane on which the four tongue portions 12 are placed is located perpendicularly to the axial line of the screw shaft 2 as a practical matter, although it is shown in parallel with the axial line of the screw shaft 2 in FIG. 3. When the four tongue portions 12 are in the actual service condition, they are placed in positions ①' to ④' in FIG. 3, which run on the respective four ball running grooves 2*a*. As is clear from FIG. 2, there may be adopted a structure in which the four tongue portions 12 are placed on the imaginary circular plane perpendicular to the axial line of the screw shaft 2.

The sealing case 21 for sealing the lubricant storage member 14 is formed into a ring-shape. The sealing case 21 has on its outer peripheral surface a male-screw portion, which can engage with the female-portion formed on the outer tube 17*b*. The sealing case 21 is provided at its rear end facing the lubricant storage member 14 with an inward flange 21*a* by which the compartments 14*a*, 14*b*, 14*c* and 14*d* can be closed. The sealing case 21 has a plurality of female-thread portions 21*b*, which are formed on its front face at regular intervals in the circumferential direction thereof. Machine screws are fitted into the above-mentioned female-thread portions 21*b*.

The wiper ring 11 removes foreign substances, which may be attached on the ball running surfaces 2*a* of the screw shaft 2. The wiper ring 11 is formed of synthetic resin. The wiper ring 11 has on its inner periphery a projection 11*a*, which can be inserted into the ball running grooves 2*a* of the screw shaft 2. The wiper ring 11 has slits 11*b* extending radially inward from the outer periphery of the wiper ring 11. These slits 11*b* form scraping faces 11*c*. The edge of the scraping face 11*c*, which comes into contact with the outer periphery of the screw shaft 2, can remove foreign substances, which may be attached on the screw shaft 2, and discharge it outside, thus preventing the foreign substances from coming into the nut member 3. Coil springs 30*a*, 30*b*, which are in the form of a ring, are attached on the outer periphery of the wiper ring 11. These springs 30*a*, 30*b* permit the wiper ring 11 having a proper resiliency to come into contact with the screw shaft 2 to ensure close contact of the edge of the scraping face 11*c* with the screw shaft 2. The close contact of the wiper ring 11 with the screw shaft 2 can ensure the sealing condition of the inside of the nut portion 3, thus preventing the lubricant from leaking out. Lubricant returning slits (not shown) may be formed on the end surface 11*d* of the wiper ring 11, which faces the nut member 3, so as to extend radially. The lubricant returning slits thus formed can positively trap and scoop up a very small amount of lubricant, which may come into the gap between the wiper ring 11 and the screw shaft 2, so as to return the thus scooped lubricant to the inside of the nut member 3.

A cover 31 for retaining the wiper ring 11 in the sealing case 21 is formed of a disc-shaped plate having an opening into which the screw shaft 2 can be inserted. The cover 31 has machine screw holes 31a formed thereon at regular intervals in the circumferential direction. The cover 31 is fixed to the sealing case 21 by fastening machine screws 32, which pass through the above-mentioned machine screw holes 31a and are fitted into the female-thread portions 21b of the sealing case 21.

Figure 4:
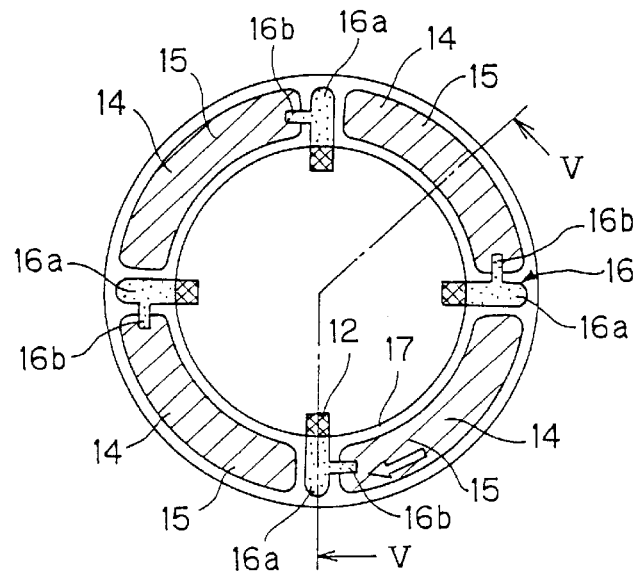
FIG. 4 is a cross-sectional view cut along the plane perpendicular to the axial line of the lubricant supply device.
Figure 5:
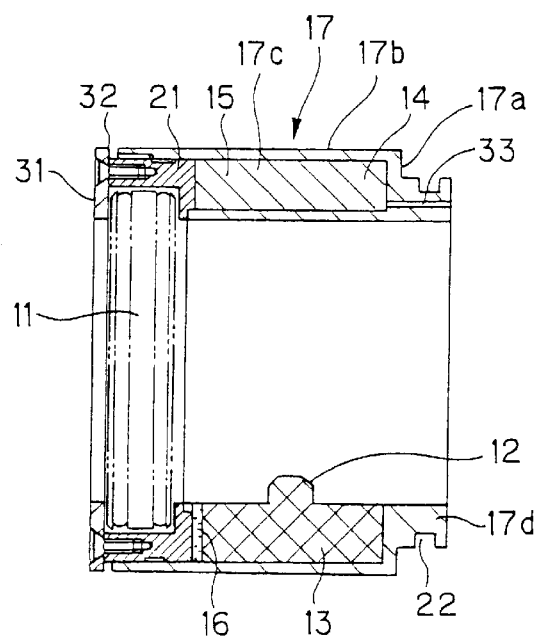
FIG. 5 is a cross-sectional view cut along the line V—V in FIG. 4.

FIGS. 4 and 5 show the lubricant supply device 10 of the present invention in an assembled state. FIG. 4 is a cross-sectional view cut along the plane perpendicular to the axial line of the lubricant supply device and FIG. 5 is a cross-sectional view cut along the line V—V in FIG. 4. The compartments 14a, 14b, 14c and 14d receive the occlusion members 15, which absorb adequately the lubricant. The application members 13, which absorb adequately the lubricant, are fitted into the slits 18. The tongue portions 12 of the application members 13, which are fitted into the slits 18 in this manner, project toward the center of the casing 17. The joint member 16 is fitted to the open end of the slit 18. The main body 16a of the joint member 16 comes into contact with the application member 13, but does not come into contact with the occlusion member 15. The elongated portion 16b of the joint member 16 comes into contact with the occlusion member 15.

After the completion of fitting the occlusion members 15, the joint members 13 and the application members 13 in the casing 17, the sealing case 21 is screwed into the casing 17 so as to ensure the sealed condition of the lubricant storage member 14. Elastomer serving as a sealing agent, which can be obtained by the two-color forming method, is provided on the contact surface of the sealing case 21 and the casing 17. The lubricant storage member 14 is almost completely sealed in this manner. The wiper ring 11 is placed in the sealing case 21. The cover 31 is fixed to the sealing case 21 by the machine screws 32, with the result that the wiper ring 11 is held in a stationary state.

After the completion of the mounting step of the lubricant supply device 10 on the nut member 3, the tongue portions 12 projecting toward the center of the casing 17 come into contact with the ball running grooves 2a of the screw shaft 2 under a prescribed pressure. The tip ends of the tongue portions 12 always store the lubricant adequately by capillary action. However, no ooze of the lubricant occurs due to the retentive function given by its surface tension. A relative rotation of the screw shaft 2 to the nut member 3 causes the lubricant to be applied on the ball running grooves 2a from the tongue portions 12 so as to form an oil film on the ball running grooves 2a. When the lubricant is applied on the ball running grooves 2a from the tongue portions 12 of the application members in this manner, the lubricant absorbed by the application members moves toward the tongue portions 12 by capillary action. The occlusion members 15 store a large amount of lubricant. The lubricant absorbed by the occlusion members 15 is supplied through the joint members 16 to the application members 13 by capillary action, according as the amount of lubricant absorbed by the application members 13 gradually decreases. As a result, the application members 13 can always absorb a constant amount of lubricant, thus making it possible to stably supply the prescribed amount of lubricant to be applied on the screw shaft 2 from the application members 13. Utilization of the capillary action makes it possible to supply surely an extremely slight required amount of the lubricant without causing discontinuance of supply.

The tongue portions 12 of the lubricant supply device 10, which are mounted on the nut member 3, move along the ball running grooves 2a along with the rotation of the screw shaft 2. The lubricant storage member 14 is divided into a plurality of compartments 14a, 14b, 14c and 14d, the number of which is equal to or larger than the number of the thread grooves of the screw shaft. The application members 13 are placed in correspondence to the compartments 14a, 14b, 14c and 14d. Accordingly, the rolling-member running surfaces of the screw shaft 2 can be lubricated over their entirety. In addition, almost all the amount of lubricant received in the lubricant supply device can be supplied to flow out, irrespective of the mounting posture of the lubricant supply device on the rolling member screw apparatus. Further, each of the application members has the single tongue portion formed thereon. It is therefore possible to prevent the application member from becoming longer in the axial direction of the screw shaft, thus providing the lubricant supply device having the decreased length in the axial direction of the screw shaft.

The joint members 16 control an amount of lubricant supplied from the occlusion members 15 to the application members 13. The optimum determination of the shapes of the elongated portion 16b and the main body 16a of the joint member 16, a contact area of the elongated portion 16b with the occlusion member 15 and the contact area of the main body 16a with the application member 13 makes it possible to supply the lubricant from the occlusion member 15 to the application member 13 in a properly controlled manner.

The casing 17 has air bents 33 as shown in FIG. 5, which communicate with the compartments 14a, 14b, 14c and 14d, respectively, so as to keep the internal pressure of the lubricant storage member 14 identical to the atmospheric pressure. Consequently, the movement of the lubricant from the occlusion member 15 to the application member 13 depends on the capillary action of the lubricant in the fiber-entangled body. Arrangement of the application member 13 in the lower portion of the lubricant storage member 14 causes the lubricant absorbed by the occlusion member 15 to move toward the application member 13 under the gravity of the lubricant. When the lubricant is consumed in its almost whole supplied amount after a lapse of a prescribed period of time, it is necessary to supply the lubricant from outside to the occlusion member 15. In such a case, it is possible to supply the lubricant to the inside of the casing 17 through the air bent 33 formed on the casing 17.

The edges of the scraping faces 11c of the wiper ring 11 slide on the screw shaft 2, while coming into contact with the ball running grooves 2a and the outer peripheral surface of the screw shaft 2, with the result that dust attached on the screw shaft 2 can be removed. The wiper ring 11 ensures the sealing condition of the inside of the nut portion 3, in which the lubricant is stored, thus making it possible to lubricate the screw shaft 2 for a long period of time. When the wiper ring 11 has the above-described lubricant returning slits (not shown), it is possible to positively trap and scoop up a very small amount of lubricant, which may come into the gap between the wiper ring 11 and the screw shaft 2, so as to return the thus scooped lubricant to the inside of the nut member 3. Accordingly, the screw shaft 2 can be lubricated for a longer period of time.

Figure 6:
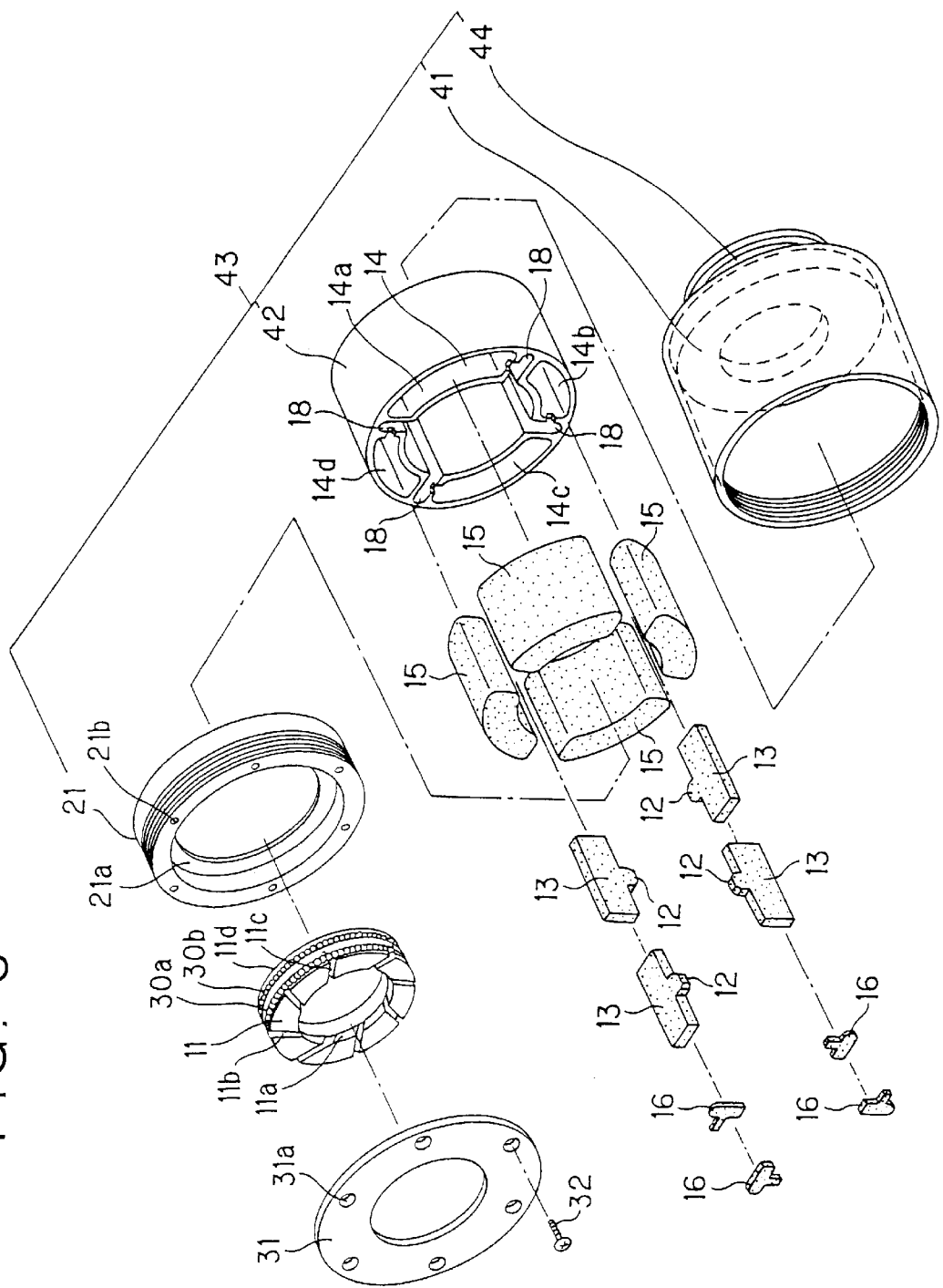
FIG. 6 is an exploded perspective view of the lubricant supply device of the second embodiment of the present invention.
Figure 7:
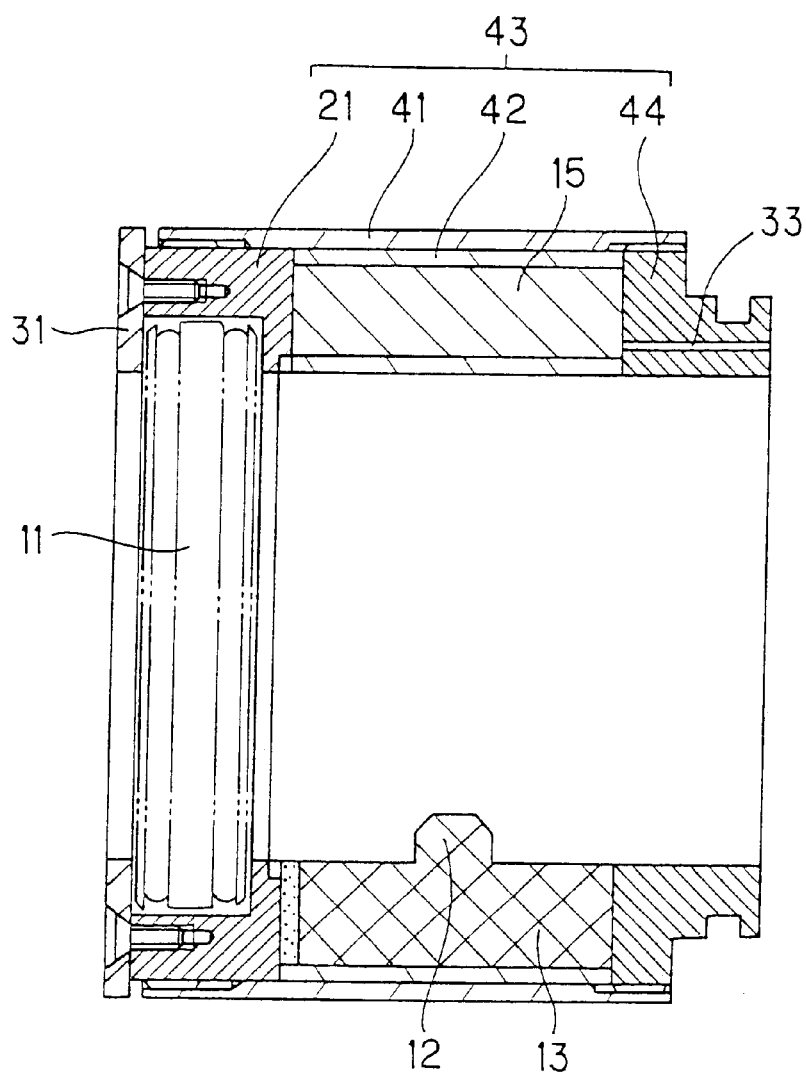
FIG. 7 is a cross-sectional view cut along the parallel plane with the axial line of the lubricant supply device as shown in FIG. 6.

FIGS. 6 and 7 show the lubricant supply device of the second embodiment of the present invention. The lubricant supply device of this embodiment also comprises application members 13, lubricant receiving members 14, occlusion members 15 and joint members 16. Each of the application members 13 has a tongue portion 12, which can come into contact with the ball running groove 2a of the screw shaft 2. The lubricant storage member 14 supplies the lubricant to the application member 13. The occlusion members 15 are received in the lubricant storage member 14. Each of the joint members 16 serves as the control device for controlling an amount of the lubricant supplied from the occlusion member 15 to the application member 13. The screw shaft 2 has four thread grooves. The lubricant storage member 14 is formed into a cylindrical shape into which the screw shaft is loosely inserted. The lubricant storage member 14 is divided into four compartments arranged in the circumferential direction of the lubricant storage member 14. The number of the application members 13 is four, which is the same as that of the compartments 14a, 14b, 14c and 14d so that the application members 13 are placed in correspondence to the compartments 14a, 14b, 14c and 14d. Each of the application members 13 has the single tongue portion 12. The lubricant supply device 10 of the second embodiment of the present invention is also provided with a wiper ring 11 for discharging foreign substances outside, which may be attached on the surface of the screw shaft 2. The lubricant supply device of this embodiment has the same structure for the ring-shaped case 21 and the cover 31 of the above-described lubricant supply device of the first embodiment of the present invention.

The lubricant supply device of the second embodiment of the present invention has a cylindrical portion 42 through which the four compartments 14a, 14b, 14c and 14d and the slits 18 pass in the longitudinal direction of the central axis of the screw shaft 2, unlike the lubricant supply device of the first embodiment of the present invention. More specifically, the casing 43 comprises a connection collar 41 having a cylindrical shape; the cylindrical portion 42 that is received in the connection collar 41 and has compartments 14a, 14b, 14c and 14d and slits 18 formed therein; a nut joint 44 screwed on the one end of the connection collar 41 to connect the lubricant supply device to the nut member 3; and a ring-shaped case 21 screwed on the other end of the connection collar 41. The application member 13 is received in the respective slit 18.

The cutting work is applied to make the connection collar 41. The thread cutting work is applied to the inside of the opposite end portions of the connection collar 41. The cutting work is also applied to make the nut joint 44 and the ring-shaped case 21. The thread cutting work is also applied to the outer peripheries of the nut joint 44 and the ring-shaped case 21 so that the nut joint 44 and the ring-shaped case 21 can be screwed into the connection collar 41. These components, i.e., the nut joint 44, the ring-shaped case 21 and the connection collar 41 have the simple shapes, thus leading to a low manufacturing cost.

The extrusion molding method (or the injection molding method) is applied to make the cylindrical portion 42. The extrusion molding method is a known molding method in which an extruder is used to heat and soften thermoplastic resin so as to extrude it from an extrusion die. The structural features that the compartments 14a, 14b, 14c and 14d and the slits 18 pass through the cylindrical portion 42 in the axial direction of the screw shaft 2 makes it possible to manufacture the cylindrical portion 42 by the extrusion molding method (or the injection molding method), thus providing the cylindrical portion 42 at a low manufacturing cost. However, manufacture of a cylindrical portion without the above-mentioned structural features require a complicated method.

Description will given below of a method for assembling the lubricant supply device. First, the cylindrical portion 42 receives the occlusion members 15, the application members 13 and the joint members 16 therein. Then, the connection collar 41 receives the above-mentioned cylindrical portion 42. The nut joint 44 and the ring-shaped case 21 are screwed into the connection collar 41. The cylindrical portion 42 is held at its opposite ends in the axial direction between the nut joint 44 and the ring-shaped case 21. There are provided closed spaces, which are defined by the compartments 14a, 14b, 14c and 14d, the nut joint 44 and the ring-shaped case 21 in this manner.

Figure 8:
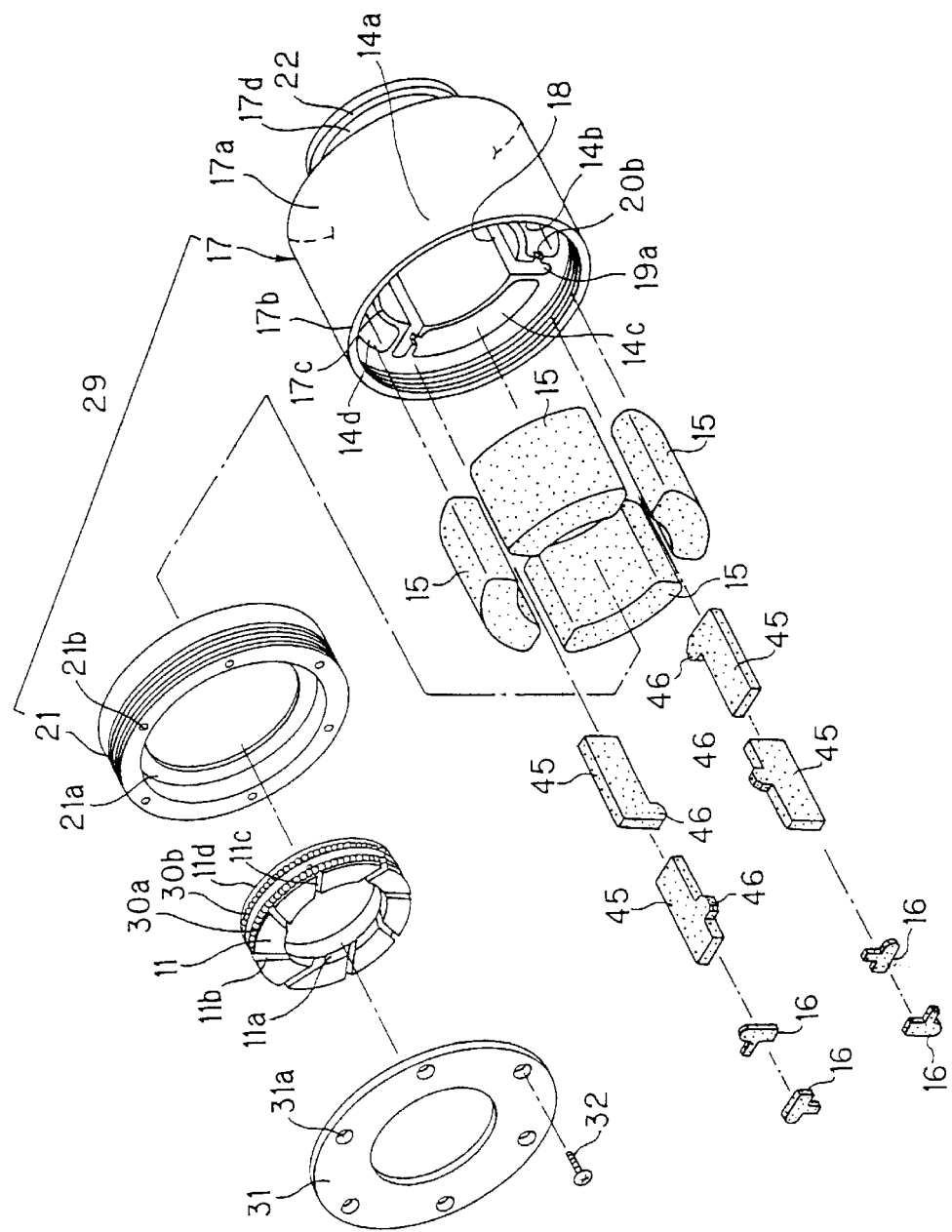
FIG. 8 is an exploded perspective view of the lubricant supply device of the third embodiment of the present invention.

FIG. 8 illustrates a lubricant supply device of the third embodiment of the present invention. The lubricant supply device is applied to a screw shaft having two ball running grooves 2a, unlike the above-described lubricant supply device of the first embodiment of the present invention. A casing 29, occlusion members 15, joint members 16, a ring-shaped case 21, a wiper ring 11 and a cover 31 are identical to those of the lubricant supply device of the first embodiment of the present invention. The same reference numerals are given to these structural elements and the description thereof is omitted.

In the third embodiment of the present invention, the lubricant storage member 14 is divided into four compartments 14a, 14b, 14c and 14d. The number of the compartments is larger than the number of the ball running grooves of the thread shaft. The number of the application members 45 is four so that each of the application members 45 is received in the respective compartments 14a, 14b, 14c or 14d. Each of the four application members 45 has the single tongue portion 46. Each of the ball running grooves 2a is lubricated by the two tongue portions 46. The number of the tongue portions 46 is not necessarily equal to the number of the ball running grooves 2a and the former may be larger than the latter in this manner.

Figure 9:
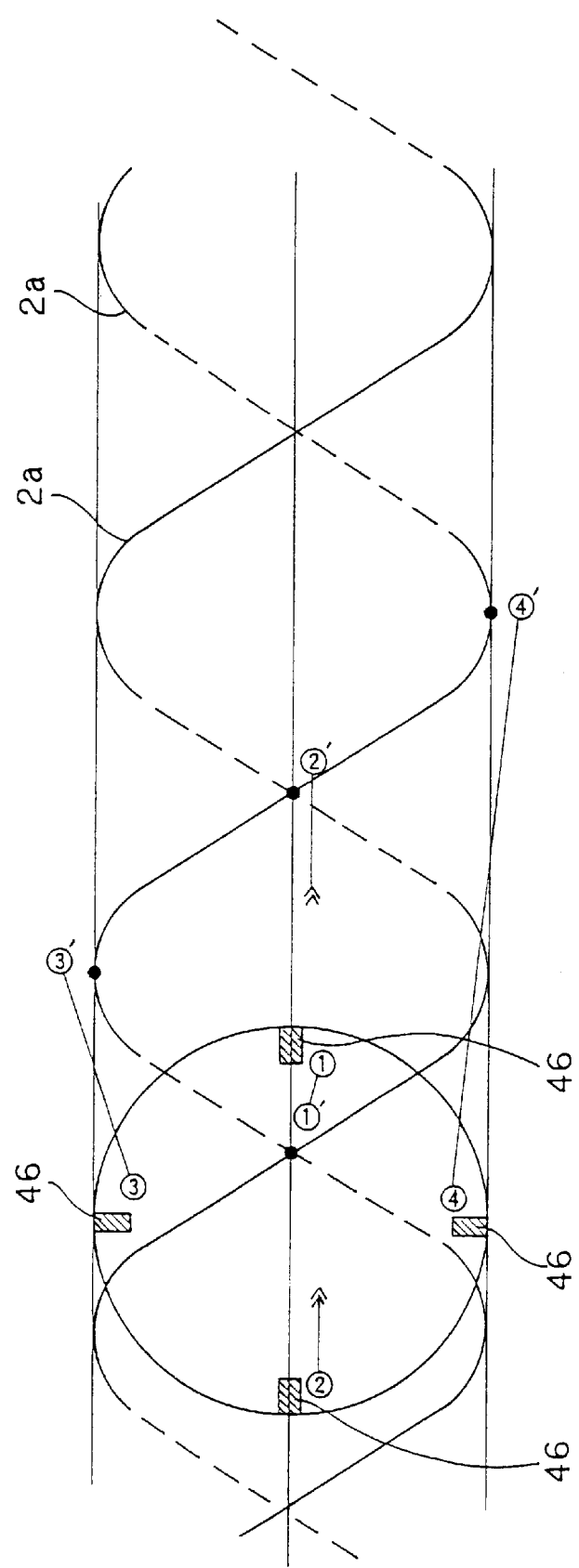
FIG. 9 is a view illustrating the relationship between the ball running grooves and the tongue portions of the third embodiment of the present invention.
Figure 10:
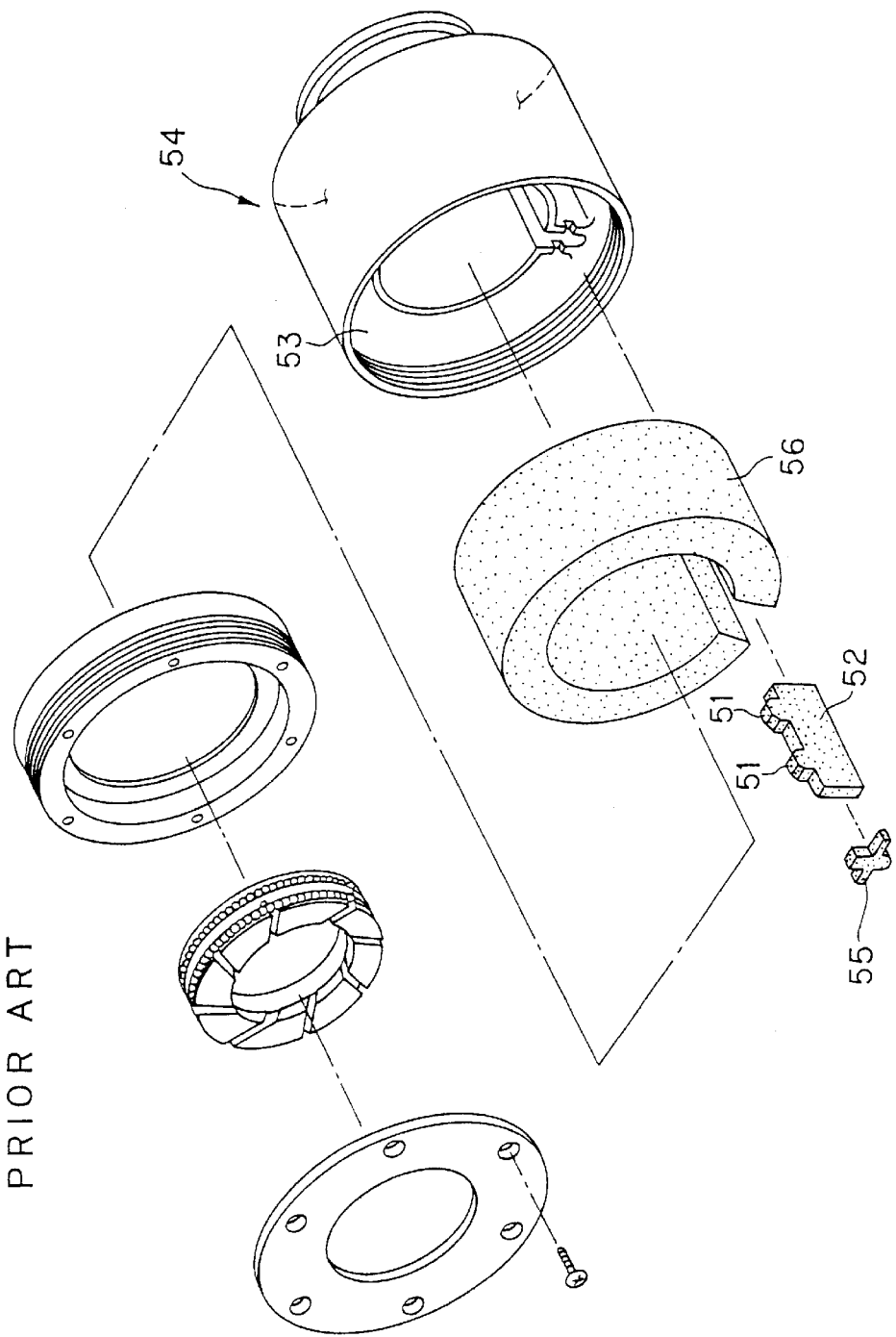
FIG. 10 is a perspective view illustrating the conventional lubricant supply device.

FIG. 9 illustrates the relationship between the two ball running grooves 2a and the four tongue portions 46. FIG. 9 is a composite view of a schematic front view of the screw shaft having the two ball running grooves 2a and a schematic side view of the lubricant supply device having the four tongue portions 46. The four tongue portions 46 are placed in positions ①  to ④ at regular intervals in the circumferential direction of the screw shaft 2, as shown in an imaginary circle in FIG. 9, and are also placed in positions ①' to ④' so as to separate from each other in the axial direction of the screw shaft 2. Such a specific arrangement of the four tongue portions 46 is caused by the fact that the respective application members 45 have on their different positions from each other the respective tongue portions 46.

In the ball screw 1 described above of the present invention, the return pipe 5 scoops up the balls 4 . . . 4 running in the ball running groove 2a of the screw shaft 2 and returns them to the different position in the ball running groove 2a, which locates away from the scooping position by prescribed pitches of the screw shaft 2. There may be adopted a specific structure that the nut member 3 has deflectors (not shown), which can scoop up the balls 4 . . . 4. More specifically, it is possible to deflect the balls 4 . . . 4 running in the ball running groove 2a of the screw shaft 2 from the ball running groove 2a by means of the deflector and return them beyond the large diameter portion of the screw shaft 2 to the portion of the ball running groove 2a, which locates away from the scooping position by a pitch of the screw shaft 2. The present invention may be applied to a so-called "side-cover type" ball screw (not shown) in which the nut member 3 is composed of a nut body having ball running grooves and side-covers fitted on the opposite ends of the nut body, ball return passages are formed in the nut body and a connecting passage is formed in each of the side covers so as to connect the ball running groove and the ball return passage with each other.

The balls are used as the rolling members in each of the above-described embodiments of the present invention. Rollers may be used as the rolling members.

According to the present invention as described in detail, the relative rotation of the screw shaft to the nut member causes the lubricant to be supplied from the tongue portions of the application members to the rolling member running surfaces of the screw shaft. The control members control an amount of lubricant supplied from the lubricant storage member to the application members. As a result, an amount of lubricant supplied from the lubricant storage member to the application members does not vary drastically in the course of time, thus leading to a constant supply of the lubricant in a prescribed amount from the application members to the screw shaft. It is therefore possible to apply the lubricant to the screw shaft in a minimum amount for a long period of time.

The relative rotation of the tongue portions to the screw shaft causes the tongue portions to move along the spiral rolling member running surfaces, while applying the lubricant onto the rolling member running surfaces of the screw shaft. The lubricant storage member is divided into a plurality of compartments arranged in the circumferential direction of the lubricant storage member. The number of the compartments is equal to or larger than the number of the thread grooves of the screw shaft. The application members are placed in correspondence to the compartments. Accordingly, the rolling member running surfaces can be lubricated entirely. In addition, almost all the amount of lubricant received in the lubricant supply device can be supplied to flow out, irrespective of the mounting posture of the lubricant supply device on an rolling member screw apparatus. Further, each of the application members has the single tongue portion formed thereon. It is therefore possible to prevent the application member from becoming longer in the axial direction of the screw shaft, thus providing the lubricant supply device having the decreased length in the axial direction of the screw shaft.

What is claimed is:

1. A lubricant supply device, which is to be fitted through rolling members to a nut member engaging with a screw shaft having at least two thread grooves to supply lubricant to the screw shaft along with a relative rotational motion of the nut member to the screw shaft and comprises:
    a plurality of application members for applying the lubricant on the screw shaft, each of said application members having a tongue portion which comes into contact with said thread grooves of the screw shaft;
    a casing forming a lubricant storage member from which the lubricant is supplied to said application members; and
    a plurality of control members formed of absorbent material for controlling an amount of the lubricant supplied from said lubricant storage member to said application members,
    wherein:
        said lubricant storage member is formed into a hollow cylindrical shape into which the screw shaft is loosely inserted, said lubricant storage member being divided into a plurality of circumferentially spaced compartments disposed about the lubricant storage member, the compartments being in number equal to or larger than a number of said at least two thread grooves of the screw shaft;
        each of said application members being disposed out of contact with said compartments but being placed in communication with an associated compartment by means of an associated control member which is disposed between and contacts at one end a compartment and at another end an associated application member; and
        each of said application members having the tongue portion.

2. A lubricant supply device, which is to be fitted to a nut member engaging with a screw shaft having at least two thread grooves through rolling members to supply lubricant to the screw shaft along with a relative rotational motion of the nut member to the screw shaft and comprises:
    a plurality of application members for applying the lubricant on the screw shaft, each of said application members having a tongue portion, which comes into contact with rolling-member running surfaces of the screw shaft;
    a casing for forming a lubricant storage member, from which the lubricant is supplied to said application members; and
    a plurality of control members for controlling an amount of the lubricant supplied from said lubricant storage member to said application members,
    wherein:
        said lubricant storage member is formed into a cylindrical shape into which the screw shaft is loosely inserted, said lubricant storage member being divided into a plurality of compartments arranged in a circumferential direction of the lubricant storage member, the number of the compartments being equal to or larger than the number of said at least two thread grooves of the screw shaft;
        said application members are placed in correspondence to the compartments; each of said application members has the tongue portion; and
    wherein:
        said casing has a plurality of slits formed therein, said slits extending in a longitudinal direction of a central axis of the screw shaft so as to correspond to the compartments, respectively; and
        said application members are fitted into the slits, respectively.

3. The device as claimed in claim 1 or 2, wherein:
said casing has a cylindrical portion through which said compartments pass in the longitudinal direction parallel with the central axis of the screw shaft.

4. The device as claimed in claim 2, wherein:
said cylindrical portion has the slits passing through the cylindrical portion in the longitudinal direction parallel with the central axis of the screw shaft.

5. The device as claimed in claim 2 or claim 4, wherein:
each of said application members and said control members comprises oil absorbent material, which can absorb the lubricant and store same;
each of said application members is formed into a plate-shape and is placed in each of the slits so as not to come into contact with any of the compartments; and
each of said control members comprises a main body and an elongated portion, said main body being placed in a cooperating slit so as to come into contact with the respective application member, but so as not to come into contact with the respective compartment, and the elongated portion extending from the main body so as to come into contact with the respective compartment.

6. The device as claimed in claim 5, wherein:

each of said compartments has an occlusion member fixed therein, said occlusion member absorbing the lubricant to store same; and a porosity of the occlusion member, the control member and the application member are determined to be smaller in this order.

7. The device as claimed in claim 2, wherein:

each of said application members and said control members comprises oil absorbent material, which can absorb the lubricant and store same;

each of said application members is formed into a plate-shape and is placed in each of the slits so as not to come into contact with any of the compartments; and each of said control members comprises a main body and an elongated portion, said main body being placed in a cooperating slit so as to come into contact with the respective application member, but so as not to come into contact with the respective compartment, and the elongated portion extending from the main body so as to come into contact with the respective compartment.

8. A rolling member screw apparatus comprising:

a screw shaft having at least two thread grooves formed spirally on an outer periphery thereof;

a nut member engaged with the screw shaft, said nut member having a rolling member circulation passage formed therein, said rolling member circulation passage including at least two loaded rolling member running surfaces formed spirally so as to correspond to said at least two thread grooves;

a plurality of running members being placed and received in the rolling member circulation passage; and a lubricant supply device for supplying lubricant to the screw shaft along with a relative rotational motion of the nut member to the screw shaft, wherein said lubricant supply device comprises:

a plurality of application members for applying the lubricant on the screw shaft, each of said application members having a tongue portion, which comes into contact with an associated thread groove of the screw shaft;

a casing for forming a lubricant storage member, from which the lubricant is supplied to said application members; and a plurality of control members formed of absorbent material for controlling an amount of the lubricant supplied from said lubricant storage member to said application members, said lubricant storage member is formed into a hollow cylindrical shape into which the screw shaft is loosely inserted, said lubricant storage member being divided into a plurality of compartments spaced circumferentially about the lubricant storage member, being in number equal to or larger than a number of said at least two thread grooves of the screw shaft;

each of said application members being disposed out of contact with said compartments but being placed in communication with an associated compartment by means of an associated control member which is disposed between and contacts each of an associated compartment and an associated application member; and each of said application members has the tongue portion.

9. A lubricant supply device, which is to be fitted to a nut member engaging with a screw shaft through rolling members to supply lubricant to the screw shaft along with a relative rotational motion of the nut member to the screw shaft and comprises:

a plurality of application members for applying the lubricant on the screw shaft, each of said application members having a tongue portion, which comes into contact with an associated thread groove of the screw shaft;

a casing for forming a lubricant storage member, from which the lubricant is supplied to said application members; and a plurality of control members formed of absorbent material for controlling an amount of the lubricant supplied from said lubricant storage member to said application members, wherein:

said lubricant storage member is formed into a hollow cylindrical shape into which the screw shaft is loosely inserted, said lubricant storage member being divided into a plurality of compartments spaced circumferentially about the lubricant storage member;

said casing having a cylindrical portion in which the compartments are disposed and pass in the longitudinal direction parallel with a central axis of the screw shaft; and each of said control members is disposed in said cylindrical portion of said casing to present one part thereof in contact with a compartment and another part in contact with an associated application member.

10. The device as claimed in claim 9, wherein:

said casing has plurality of slits formed therein, said slits extending in the longitudinal direction parallel with the central axis of the screw shaft so as to communicate with the respective compartments;

said application members being placed in communication with the compartments and fitted into the slits, respectively; and said casing having the slits passing through the cylindrical portion in the longitudinal direction parallel with the central axis of the screw shaft.

* * * * *